(12) United States Patent
Bitauld (10) Patent No.: US 9,967,037 B2
(45) Date of Patent: May 8, 2018

(54) RECEPTION AND GENERATION OF LIGHT

(71) Applicant: Nokia Technologies Oy, Espoo (FI)

(72) Inventor: David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days. days.

(21) Appl. No.: 15/112,571

(22) PCT Filed: Feb. 6, 2014

(86) PCT No.: PCT/IB2014/058838
§ 371 (c)(1),
(2) Date: Jul. 19, 2016

(87) PCT Pub. No.: WO2015/118383
PCT Pub. Date: Aug. 13, 2015

(65) Prior Publication Data
US 2016/0337045 A1 Nov. 17, 2016

(51) Int. Cl.
*G02F 1/313* (2006.01)
*G02B 27/28* (2006.01)
(Continued)

(52) U.S. Cl.
CPC .......... *H04B 10/70* (2013.01); *H04L 9/0852* (2013.01)

(58) Field of Classification Search
None
See application file for complete search history.

(56) References Cited

U.S. PATENT DOCUMENTS 5,796,510 A * 8/1998 Yao .......................... G02F 1/01
359/245
6,049,404 A * 4/2000 Wu ........................ G02B 6/272
385/16
(Continued)

FOREIGN PATENT DOCUMENTS

CN 102819116 A 12/2012
EP 2495894 9/2012
(Continued)

OTHER PUBLICATIONS

Mandal et al., "Implementation of Secure Quantum Protocol Using Multiple Photons for Communication", Cryptography and Security, Aug. 30, 2012, pp. 1-6.
(Continued)

*Primary Examiner* — Oommen Jacob
(74) *Attorney, Agent, or Firm* — Alston & Bird LLP (57) ABSTRACT

A light input is divided into a plurality of light outputs by a structure comprising a first beam splitter configured to divide the light input into a first part and a second part, a first polarization beam splitter configured to provide from the first part a first polarized part and a second polarized part, wherein the first polarized part is for providing a first output and the second polarized part for providing a second output, at least one polarization altering device configured to alter the polarization of light in the second part, and at least one second polarization beam splitter configured to receive light altered by respective at least one polarization altering device and provide therefrom at least one third polarized part for providing at least one third output. A light output can be generated based on similar principles in reverse.

17 Claims, 8 Drawing Sheets

(51) Int. Cl.
*H04B 10/70* (2013.01)
*H04L 9/08* (2006.01)

(56) References Cited

U.S. PATENT DOCUMENTS

| | | | | |
|---|---|---|---|---|
| 6,097,518 A * | 8/2000 | Wu | ............... | G02B 6/272 398/1 |
| 6,134,358 A * | 10/2000 | Wu | ............... | G02B 6/272 385/11 |
| 6,188,520 B1 | 2/2001 | Huang | | |
| 6,208,442 B1 * | 3/2001 | Liu | ............... | G02B 6/29302 398/9 |
| 6,289,104 B1 * | 9/2001 | Patterson | ............... | H04L 9/0858 380/256 |
| 6,552,833 B2 * | 4/2003 | Liu | ............... | G02B 6/29302 398/65 |
| 6,687,423 B1 * | 2/2004 | Yao | ............... | G02B 6/29358 385/11 |
| 7,102,821 B1 * | 9/2006 | Liu | ............... | G02B 6/272 359/484.04 |
| 7,536,012 B1 * | 5/2009 | Meyers | ............... | H04L 9/0858 380/44 |
| 8,054,976 B2 | 11/2011 | Harrison et al. | | |
| 8,625,989 B2 * | 1/2014 | Du | ............... | G02B 6/4215 398/43 |
| 2005/0189478 A1 | 9/2005 | Lagasse | | |
| 2006/0290941 A1 | 12/2006 | Kesler et al. | | |
| 2008/0144823 A1 | 6/2008 | Abe et al. | | |
| 2009/0028332 A1 | 1/2009 | Parker et al. | | |
| 2009/0052837 A1 * | 2/2009 | Safrani | ............... | G02F 1/31 385/16 |
| 2009/0153950 A1 * | 6/2009 | Kong | ............... | H01S 3/2383 359/334 |
| 2010/0239245 A1 * | 9/2010 | Yao | ............... | G01J 4/00 398/27 |
| 2010/0290626 A1 | 11/2010 | Jenkins et al. | | |
| 2010/0296092 A1 | 11/2010 | Cho et al. | | |
| 2012/0087500 A1 * | 4/2012 | Ukita | ............... | H04B 10/70 380/256 |
| 2013/0084079 A1 | 4/2013 | Nordholt et al. | | |
| 2014/0285813 A1 * | 9/2014 | Shi | ............... | G01J 4/04 356/491 |
| 2015/0185584 A1 * | 7/2015 | Smith | ............... | G02F 1/133385 385/16 |
| 2016/0337045 A1 * | 11/2016 | Bitauld | ............... | H04B 10/70 |
| 2017/0052091 A1 * | 2/2017 | Mori | ............... | G01M 11/088 |

FOREIGN PATENT DOCUMENTS

| | | |
|---|---|---|
| JP | 2001-166260 A | 6/2001 |
| JP | 2009-033747 A | 2/2009 |
| JP | 2011-511523 A | 4/2011 |
| JP | 2012-080496 A | 4/2012 |
| WO | WO 2006/006231 A1 | 4/2008 |
| WO | 2009095644 | 8/2009 |
| WO | 2011039503 | 4/2011 |
| WO | 2013/179094 A1 | 12/2013 |
| WO | 2014/060793 A1 | 4/2014 |

OTHER PUBLICATIONS

Chen et al., "Experimental implementation of quantum entanglement and hyperentanglement with a fiber-based two-photon source", Proceedings of Quantum Communications and Quantum Imaging, vol. 7092, 2008, p. 1-9.

Office action received for corresponding Vietnam Patent Application No. 1-2016-03138, dated Nov. 7, 2016, 1 page of office action and 1 page of office action translation available.

International Search Report and Written Opinion received for corresponding Patent Cooperation Treaty Application No. PCT/IB2014/058838, dated Nov. 3, 2014, 15 pages.

Extended European Search Report for corresponding European Application No. 14882074.9 dated Aug. 3, 2017, 9 pages.

Albota, M.A. et al., *Three-Dimensional Imaging Laser Radar With a Photo-Counting Avalanche Photodiode Array and Microchip Laser*, Applied Optics, vol. 41, No. 36 (Dec. 20, 2002) 7671-7678.

Office Action for Japanese Application No. 2016-550601 dated Oct. 29, 2017, 10 pages total.

Office Action for Japanese Application No. 2016-550601 dated Feb. 13, 2018, 7 pages.

Office Action for Korean Application No. 10-2016-7024330 dated Jan. 22, 2018, 9 pages.

* cited by examiner

RECEPTION AND GENERATION OF LIGHT

RELATED APPLICATION

This application was originally filed as PCT Application No. PCT/IB2014/058838 filed Feb. 6, 2014.

This disclosure relates to reception and/or generation of light by an optical structure.

Light receiving and/or generating optical structures can be used for various purposes. For example, such structures can be used for quantum cryptography, and more particularly for quantum key distribution (QKD) via optical channels. Other examples of possible uses include ellipsometry and polarization imaging.

A compact light receiver and/or emitter structure, for example a compact QKD receiver, can be provided using integrated photonic platform. However, this requires coupling of light input into a single-mode waveguide. This can be a relatively difficult, and has in its part limited large scale commercial utilisation of quantum cryptography e.g. for securing communications between communication devices. This can be the case in particular if at least one of receiver and transmitter is for mobile free-space communications.

It is noted that the issues discussed in this specification are not limited to any particular communication environments and apparatus but may occur in any context where communications are secured based on quantum cryptography.

Embodiments of the invention aim to address one or several of the above issues.

In accordance with an embodiment there is provided an apparatus for dividing light input into a plurality of light outputs, comprising a first beam splitter configured to divide the light input into a first part and a second part, a first polarization beam splitter configured to provide from the first part a first polarized part and a second polarized part, wherein the first polarized part is for providing a first output and the second polarized part for providing a second output, at least one polarization altering device configured to alter the polarization of light in the second part, and at least one second polarization beam splitter configured to receive light altered by respective at least one polarization altering device and provide therefrom at least one third polarized part for providing at least one third output.

In accordance with another embodiment there is provided a method for dividing light into a plurality of light outputs, comprising dividing a light input into a first part and a second part, dividing the first part into a first polarized part and a second polarized part to provide a first output and a second output, altering at least once polarization of light in the second part, and dividing by at least one second polarization beam splitter the light with altered polarization into at least one third polarized part to provide at least one third output.

In accordance with a more specific aspect the at least one second polarization beam splitter provides at least one fourth output. The apparatus may comprise at least one light deflecting device configured to direct the light in the second polarized part produced by the first polarization beam splitter and at least one fourth polarized part produced by the at least one second polarization beam splitter to be in parallel with the first polarized part at the respective outputs of the apparatus. The at least one polarization altering device may comprise a half-wave plate and/or a quarter-wave plate.

In accordance with an aspect a first polarization altering device, a second polarization altering device configured to provide a different alteration of polarization, a second beam splitter configured divide the second part further into a third part and a fourth part and to project the third part into a second polarization beam splitter and the fourth part into the second polarization altering device are provided. The second polarization beam splitter is configured to provide a third output and a fourth output from light propagated through the first polarization altering device. A third polarization beam splitter is configured to receive light altered by the second polarization altering device and provide a fifth output and a sixth output.

The apparatus may comprise at least two polarization altering devices arranged in serial configuration or in parallel configuration for altering polarization of light in the second part.

A detector apparatus configured to detect light at the plurality of outputs may also be provided.

In accordance with an embodiment an apparatus for generating light with controlled polarization is provided, comprising at least three light inputs, polarization beam splitters operated in reverse to combine and/or direct polarized light from associated light inputs into an output thereof, at least one polarization altering device configured to alter at least one of the polarizations, and an output for light propagated through the polarization beam splitters and the at least one polarization altering device.

In accordance with yet another embodiment a method for generating light with controlled polarization is provided, comprising inputting at least three light inputs into polarization beam splitters operated in reverse for combining and/or directing polarized light from the light inputs into an output of a respective polarization beam splitter, altering the polarization of at least one of the polarized lights, and directing light propagated through the polarization beam splitters and the polarization altering to an output.

The light generation may comprise use of a first polarization altering device and a second polarization altering device configured to provide a different alteration of polarization, and a first, a second and a third polarization beam splitter. The first polarization beam splitter receives light from a first input and a second input to provide in an output thereof first and second polarized light, the second polarization beam splitter receives light from a third input and a fourth input to provide in an output thereof third and fourth polarized light for input into the first polarization altering device, and the third polarization beam splitter receives light from a fifth input and a sixth input to provide in an output thereof fifth and sixth polarized light for input into the second polarization altering device.

It should be appreciated that any feature of any aspect may be combined with any other feature of any other aspect.

Embodiments will now be described in further detail, by way of example only, with reference to the following examples and accompanying drawings, in which.

Figure 1:
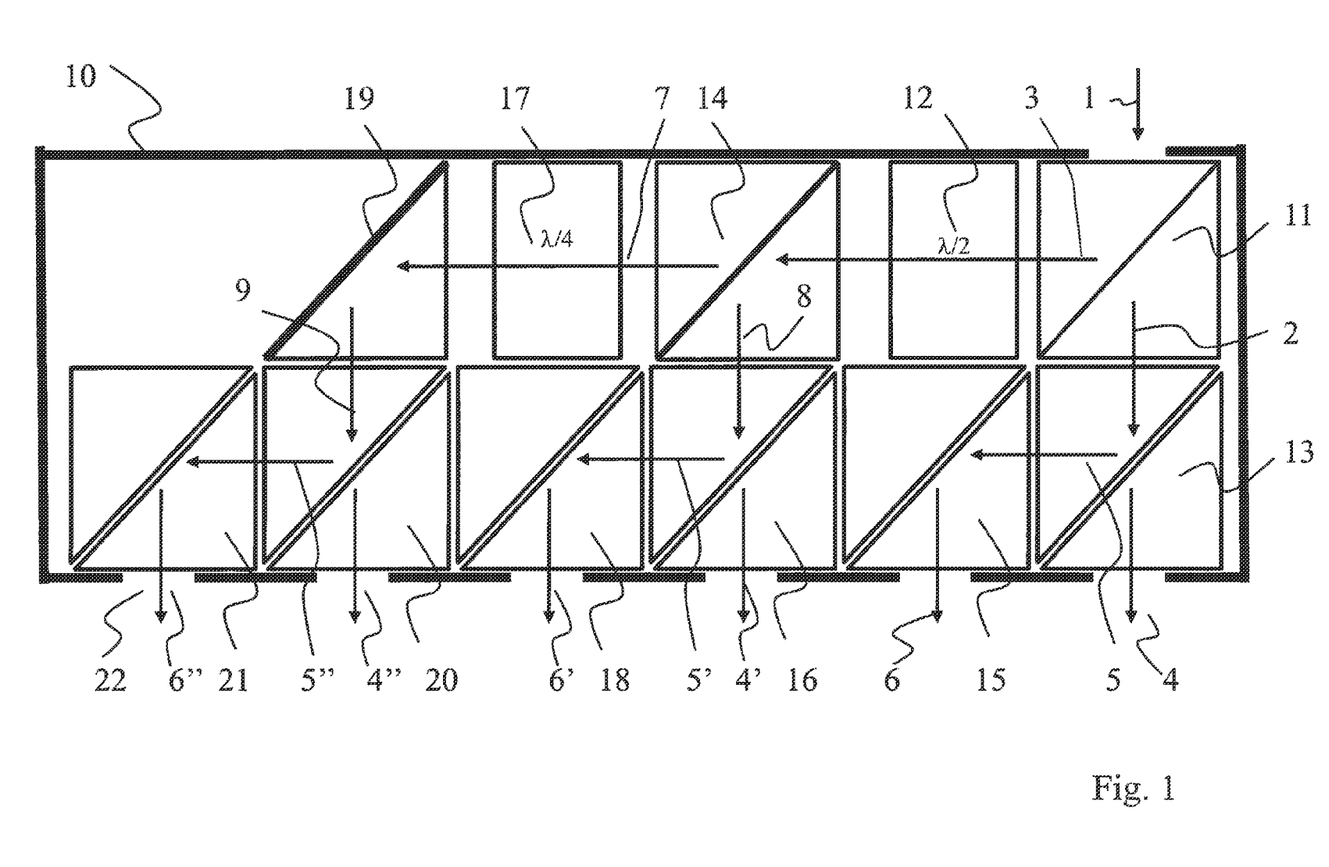
FIGS. 1 and 2 show two schematic examples for optical light receiving structures for producing a plurality of differently polarized light outputs.
Figure 2:
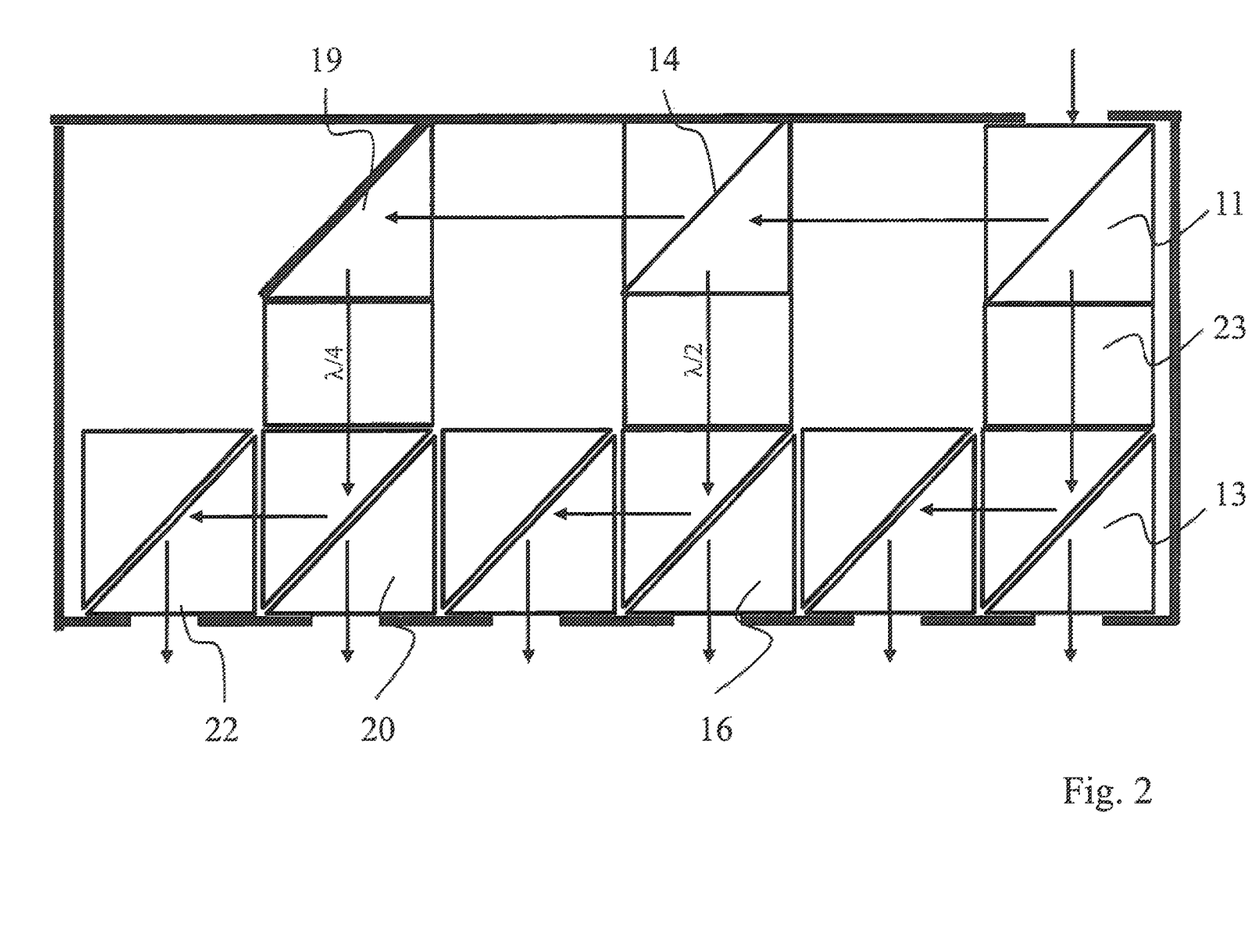

Certain examples are now described with reference to in FIGS. 1 and 2 showing compact beam splitter cube stack structures providing polarization analysers. A possible simple and compact way to provide a polarization analyser is to provide a structure combining in a stack miniature beam splitter cubes, polarization beam splitter cubes and wave plates. The structure is arranged to provide a plurality of outputs. An appropriate detector apparatus can be placed at Poincare sphere cardinal points to readout the outputs.

Different optical constructions to readout the outputs can be provided with an appropriate type of detector for a given application, for example for QKD, ellipsometry, and polarization imaging. This structure allows simultaneous measurement of all components of the polarization. This is opposed to conventional techniques where these are measured sequentially by rotating wave plates and/or a polarizer. This simultaneous measurement allows instant calculation of depolarization of light. It is thus very robust against intensity noise of the source.

FIG. 1 shows a compact cube stack 10 projecting the input light polarization on the six Poincare sphere cardinal points. The six outputs can have two different polarizations depending on whether the output is through a polarization beam splitter (PBS) or the output is reflected. The intensity of the six outputs is proportional to the measurement of the original input light in six different polarizations.

In the cube stack configuration of FIG. 1, a first non-polarizing beam splitter (BS) 11 divides input beam 1 into light beams 2 and 3. Light 2 going downward is then separated by a polarization beam splitter (PBS) 13. A part of this light is output from the structure 10 via the PBS 13, see arrow 4. Light 5 is first deflected horizontally by the PBS 13 and then directed back down out of the structure by another PBS 15, see arrow 6.

Controlled phase shifts between the polarization components of the light wave are provided, thus altering the polarization. The polarization is altered in stages by different wave plates. Light beam 3 deflected horizontally by the first BS 11 is rotated by a half-wave plate 12. The light is then separated and partly reflected down by a second BS 14. The remaining part of light 7 is first propagated through a quarter-wave plate 17. After the quarter-wave plate this part of light 7 is then deflected downwards e.g. by a mirror 19.

PBS block pairs 16, 18, and 20, 21 treat light 8 and 9 output from blocks 14 and 19, respectively, in the same manner as PBS blocks 13 and 15 treat light 2 from BS block 11. Thus each output of the light components is treated by a similar arrangement of cubes.

Instead of PBS, the deflection out of the structure at the outputs 22 can also be provided e.g. by a high reflection mirror. Thus, although in FIG. 1 the entire bottom layer is provided by PBS cubes, one of each pair of cubes (cubes 15, 18, and 21) can be replaced by a simple high reflection mirror. The implementation of the structure may be easier if all cubes in the lower row are similar. On the other hand, component cost for the structure may be lower if a lesser number of PBS cubes is used.

The cube components can be adhered to each other for example by means of gluing, heat or mechanical attachment means.

Configuration of the structure of FIG. 2 is similar to that of FIG. 1 except the way the wave plates are arranged in the stack so that the light propagates only through one wave plate. That is, a half-wave plate 25 is provided between BS 14 and PBS 16 and a quarter-wave plate 27 is provided between PBS 19 and PBS 20. This can be used to avoid cumulating possible imperfections of the wave plates. A spacer 23 can be provided between the first beam splitter element 11 and the first polarisation beam splitter 13 to compensate for the volume of the wave plates. Because of this the volume of the stack arrangement of FIG. 2 can be slightly larger than that of FIG. 1.

Stacked beam splitter structures of FIGS. 1 and 2 produce six outputs 22. A detector can be arranged at each of them to provide readout of the six outputs. A more complex optical system can be used to project the outputs on a detector array or a charge coupled device (CCD).

Figure 3:
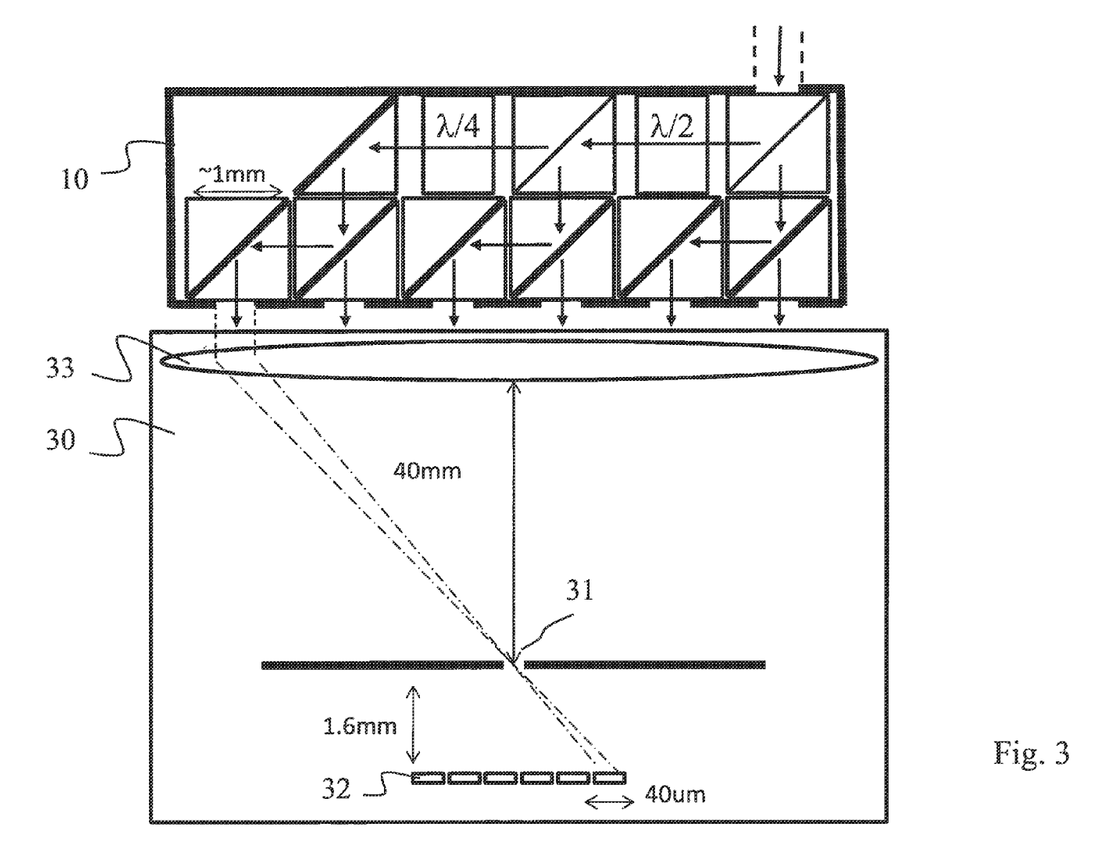
FIGS. 3 to 5 show diagrams of examples how to project light outputs of the optical light dividing structure of FIG. 1, FIGS. 6 and 7 are diagrams for light emitting apparatus.

FIG. 3 illustrates projection of the outputs on a single photon detector array through a pinhole. The optical system comprises detector apparatus 30 allowing projection of the six outputs of the beam splitter stack arrangement 10 on a single photon detector array 32. The detector array 32 is arranged behind a pinhole 31. Light output from the outputs of the beam splitter stack arrangement 10 is guided to the pinhole and the respective photon detector of the array 32 by lens 33. The detector apparatus of FIG. 3 may be provided e.g. for single photon detection.

FIG. 3 show certain examples for the dimensions of the components and distances. In the example the cubes of the polarizing structure are shown to be 1×1 mm, the distance between the lens and pinhole to be 40 mm and the distance between the pinhole and the array to be 1.6 mm. Each detector element of the array is shown to be in the order of 40 μm. However, it shall be appreciated that the dimensions shown in FIG. 3 are non-limiting examples only that are given to illustrate a possible size of a device implemented using currently commercially available components.

Figure 4:
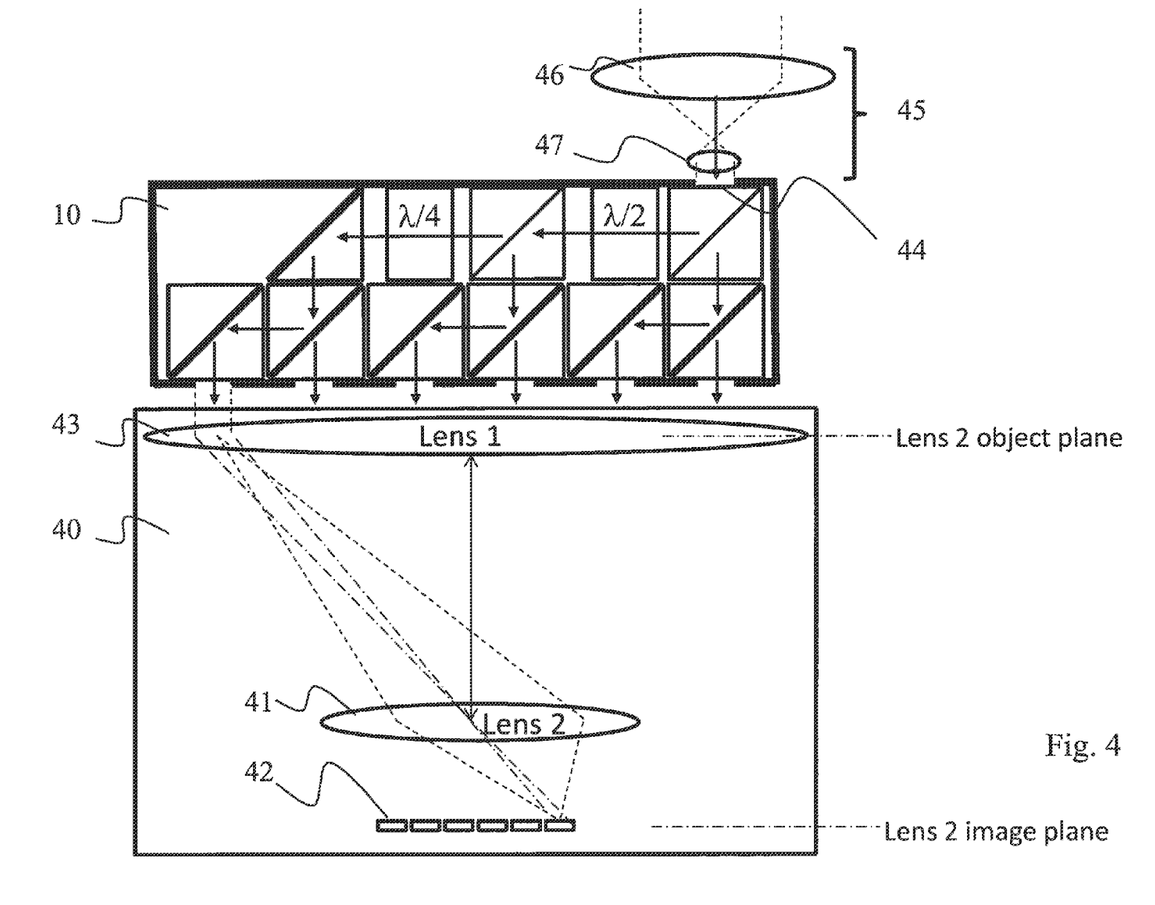

The relatively simple detector configuration of FIG. 3 can have too narrow field of view for certain applications. FIG. 4 shows detector apparatus 40 where the field of view is broadened by replacing the pinhole of FIG. 3 by a lens 41. In the apparatus 40 light output from the six outputs of the beam splitter stack arrangement 10 is guided via lenses 43 and 41 to the respective photon detector of the single photon detector array 42.

FIG. 4 shows also the possibility of widening the input aperture 44 with a beam expander arrangement 45. The beam expander arrangement comprises two lenses 46 and 47. Use of a beam expander can however decrease the field of view and may therefore not be desired in all applications.

Figure 5:
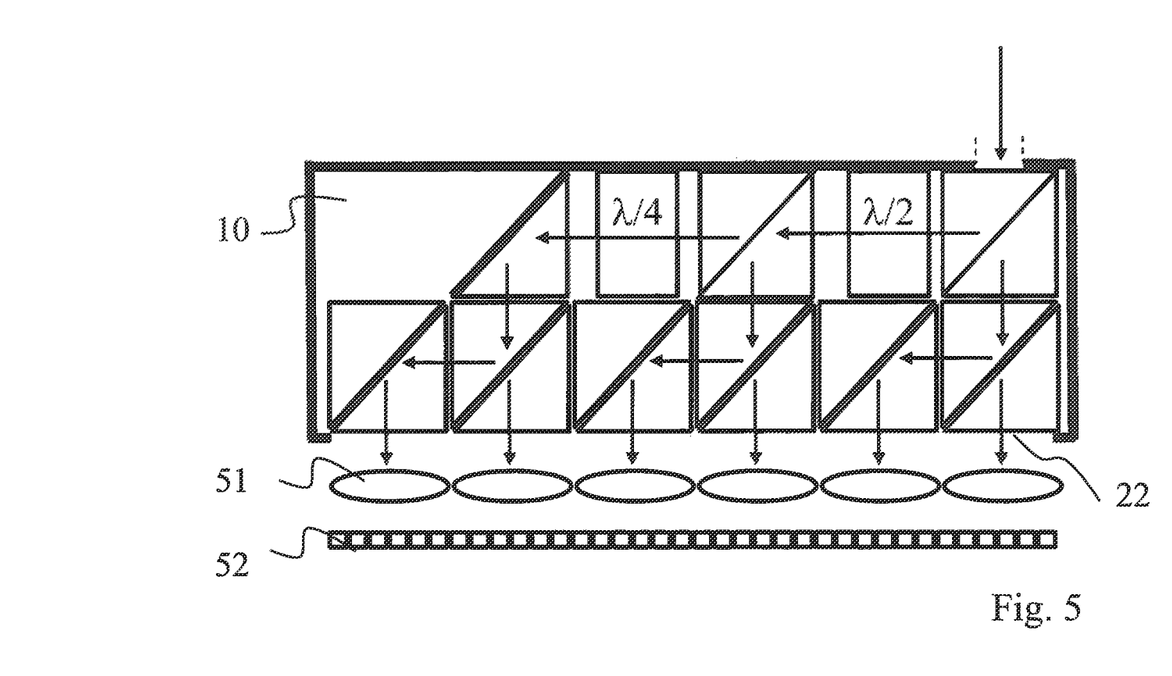

A cube beam splitter stack can also be used to perform polarization imaging. An example of this is shown in FIG. 5. In this example outputs 22 from a stack configuration 10 are fed through a lens arrangement 51 to a charge coupled device (CCD) camera 52.

A polarizing cube stack structure described herein can also be used in reverse direction to generate light with a controlled polarization, e.g. for a QKD emitter. The stacked structure can be used for example to generate one out of six polarization (horizontal, vertical, diagonal, anti-diagonal, circular right, circular left) by switching on one out of the six light sources on one at a time.

Figure 6:
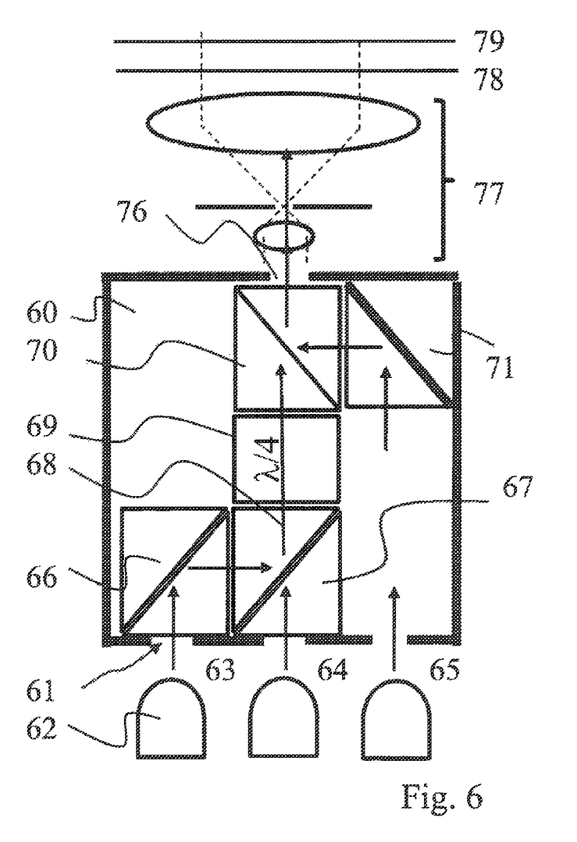
Figure 7:
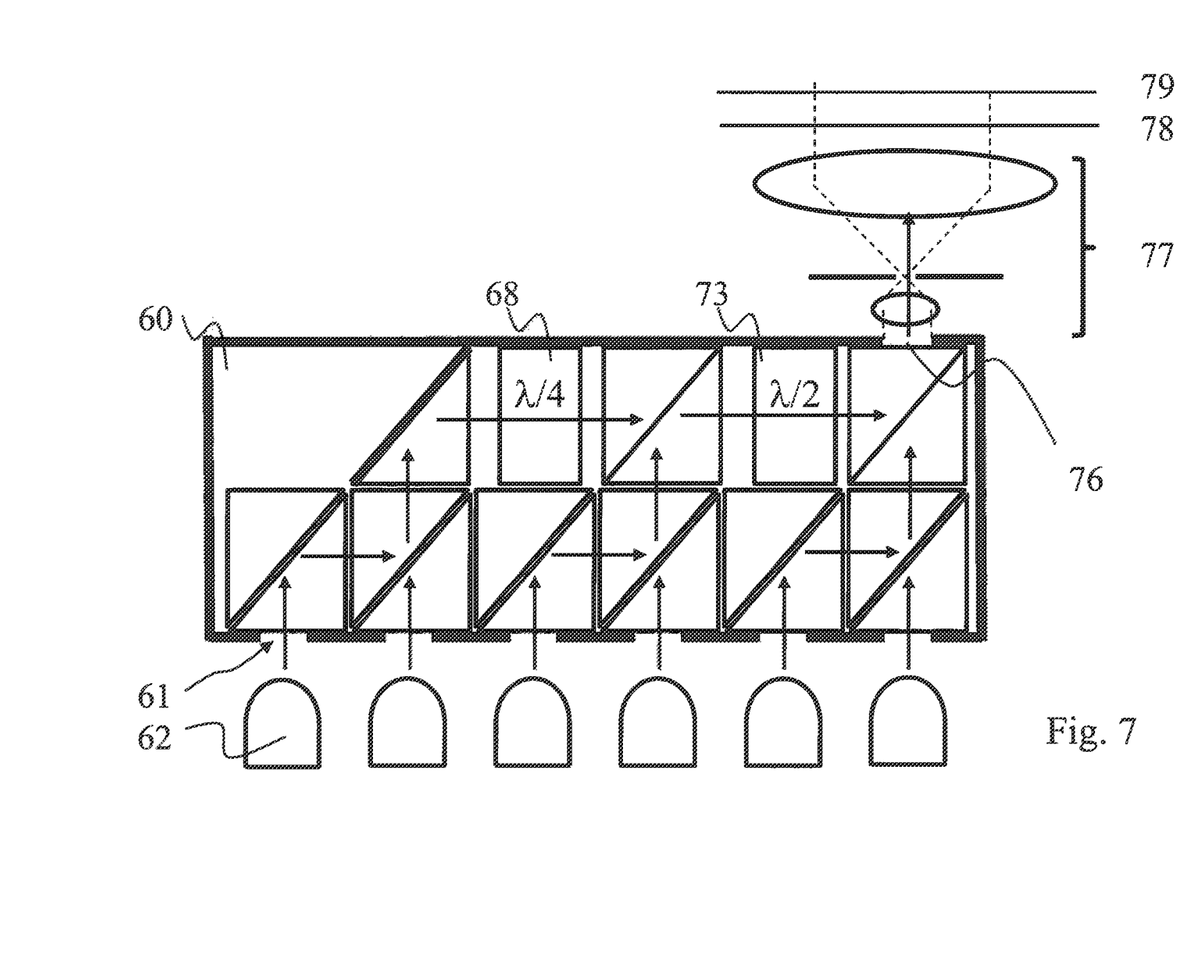

FIGS. 6 and 7 show certain examples representing QKD emitters for six and three state protocols, respectively. Inputs 61 of these structures correspond to the outputs 22 of FIGS. 1-5. One of the six cardinal points of the Poincare sphere can be handled by switching on one of the six inputs 61 of the arrangement 60. The emitter arrangement can be provided e.g. with similar polarizer configurations as shown in FIGS. 3, 4 and 5 and by replacing the detector apparatus by light emitting apparatus. The emitter apparatus 62 can comprise e.g. light emitting diodes (LEDs) or lasers. For example, surface mounted LEDs can be provided.

For example, in FIG. 6 apparatus for generating light with controlled polarization a plurality of inputs 61 is provided for receiving different polarizations of light, illustrated by arrows 63, 64 and 65. A polarizing beam splitter (PBS) cube 67 can be used in reverse for combining/redirecting two inputs in one single output. In addition, the PBS cubes can provide functionality that "purifies" the polarization, i.e. the PBS cubes used in reverse can provide polarization enhancement of the input light. Because of the capability of functioning either way (splitting an input into two different polarizations in two outputs, output of two different inputs from the same output in two different polarizations), the PBS cubes are occasionally called polarization beam splitters/combiners (PBS/PBC). Regardless the naming the cubes can be used to combine/l redirect a plurality of input light beams into one output and filter out "wrong" polarizations in the input light if the light source is not well enough polarized.

PBS 67 is configured to receive light 63 from a first input and light 64 from a second input. A device 66 for altering the direction of light 63 from the first input towards PBS 67 is also shown. Light 68 from PBS 67 is input into a polarization altering device 69. In the example this device is provided by a quarter-wave plate.

A second PBS cube 71 for altering the direction of third light input 65 is also shown. PBS 71 can also purify the polarization of input beam 65 if this is needed. A beam splitter operating in reverse or combiner 70 configured to guide light 69 from the polarization altering device 68 and light 65 from the third input and output by PBS 71 to the output 76 of the apparatus is also shown. By means of the apparatus 60 three different polarizations can be provided at the output 76.

FIG. 7 shows an apparatus that is configured to receive six input states. To provide six different output states the apparatus is provide with two wave plates 68 and 73, three PBS cubes and two beam guiding elements arranged as shown.

In the above example polarized light is produced from one source at a time and light from the different inputs is not combined into a beam but only directed to one output. In accordance with a possibility combining of light input simultaneously via two or more of the inputs may be provided.

A filtering arrangement can be provided at the output 76 of the emitter. The filtering arrangement can comprise e.g. a spatial filter 77, a spectral filter 78 and a neutral density filter 79. This can be advantageously used for example for quantum key distribution (QKD) as it should be impossible to distinguish between the light created e.g. by different lasers or LEDs. A single spectral filter can be used to ensure that all the light going out of the device has the same wavelength independent the laser/LED that created it. Spatial filtering can also be used to prevent the light projecting in slightly different directions depending on which laser created it.

Figure 8:
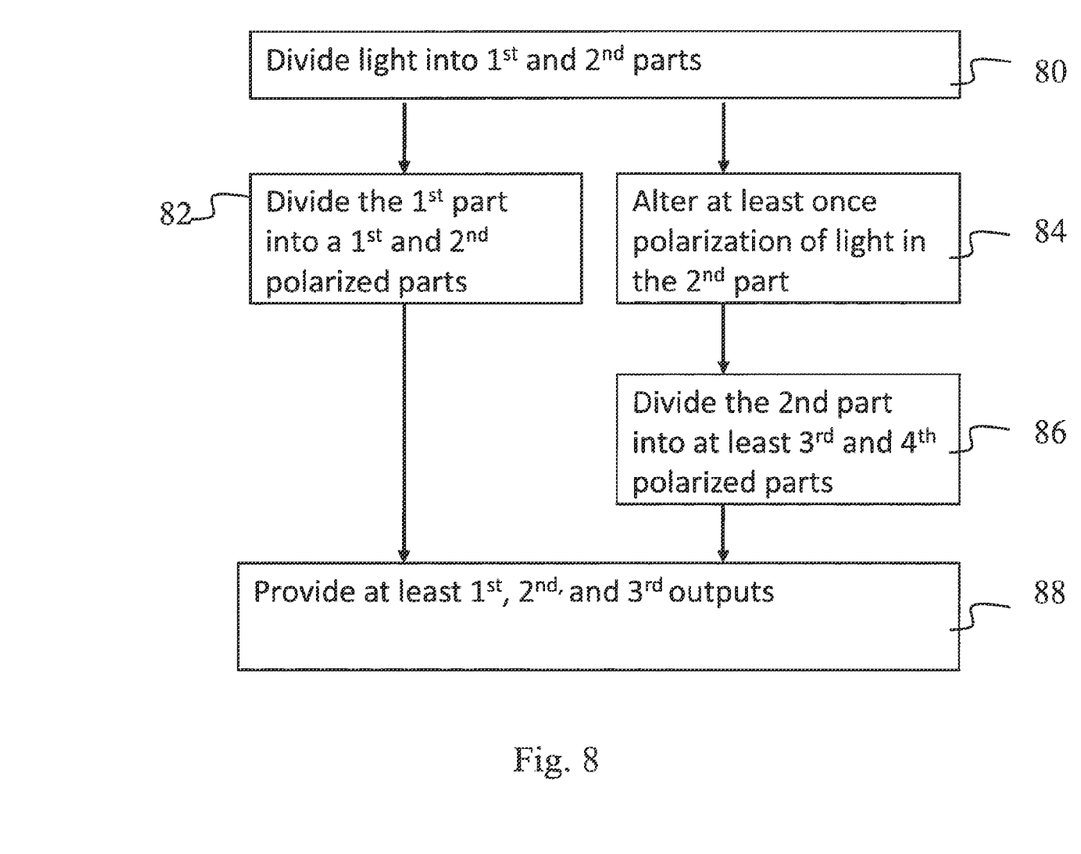
FIG. 8 is a flowchart for operation at an optical receiver.

FIG. 8 shows a flowchart for operation of a polarizing light receiving apparatus where light is divided into a plurality of light outputs. A light input is divided at 80 into a first part and a second part. The first part is further divided at 82 into a first polarized part and a second polarized part to provide a first polarized output and a second polarized output at 88. The first polarized part can be directed directly to a first output of the apparatus whereas the second polarized part can be projected to a device configured to redirect the light to a second output of the apparatus. The second polarized part can be directed to be in parallel with the first polarized part.

Polarization of light in the second part is altered at least once at 84. In accordance with an embodiment the polarization is altered twice, first by a half-wave plate and then by a quarter-wave plate.

At least one second polarization beam splitter divides at 86 the light with altered polarization into at least third polarized part and fourth polarized part. These parts provide at least a third polarized output and at least a fourth polarized output at 88.

The third polarized part can be directed directly to a third output of the apparatus whereas the fourth polarized part can be projected to a device configured to redirect the light to a fourth output of the apparatus. Light of the second polarized part can be directed to be in parallel with the light of first, second and third polarized parts at the respective outputs.

In accordance with an embodiment six outputs are provided at 88 by an apparatus comprising a first polarization altering device and a second polarization altering device configured to provide a different alteration of polarization than the first polarization altering device. The second part provided by the first beam splitting is divided further into a third part and a fourth part. The third part is guided into a second polarization beam splitter and the fourth part into the second polarization altering device. The second polarization beam splitter receives light altered by a first polarization altering device and provides therefrom a third polarized part and a fourth polarized part to provide third and fourth polarized outputs. In FIG. 8 this would occur at 86. A third polarization beam splitter receives light altered by the second polarization altering device and provides therefrom a fifth polarized part and a sixth polarized part to provide a fifth polarized output and sixth polarized output. The fifth polarized part can be directed directly to a fifth output of the apparatus whereas the sixth polarized part can be projected to a device configured to redirect the light to a sixth output of the apparatus. Light of the sixth polarized part can be directed to be in parallel with the light of first, second, third, fourth and fifth polarized parts at the respective outputs.

Figure 9:
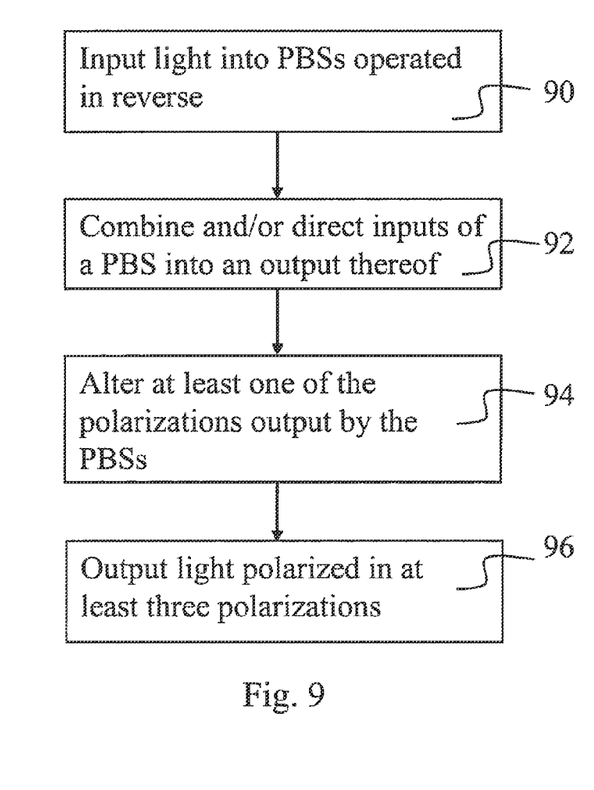
FIG. 9 is a flowchart for operation at a generator of optical signals.

FIG. 9 shows a flowchart for generating light with controlled polarization. At least three polarizations of light are input at 90 into polarization beam splitters operated in reverse. The inputs are combined and/or directed at 92 into an output of the respective polarization beam splitter. Polarization of at least one of the polarized lights is altered at 94 by a polarization altering device. Light in at least three polarizations is then directed to an output at 96 after being propagated through the polarization beam splitters and the polarization altering. This method operates for at least three inputs. If there are more inputs, the polarizing and polarization altering operations need to be multiplied as shown in FIG. 7. In accordance with a possibility light from a first input and a second input provides in a first output first and second polarized light, light from a third input and a fourth provides in a second output third and a fourth polarized light for input into a first polarization altering device, and light from a fifth input and a sixth input provides in a third output fifth and sixth polarized light for input into a second polarization altering device. The polarization of the third and fourth polarized light is altered by the first polarization altering device and the polarization of the fifth and sixth polarized light is altered by the second polarization altering device.

In accordance with an aspect polarizations of the light inputs may be enhanced by the polarization beam splitters.

The herein described arrangement enables a compact light receiver and/or emitter structure. The structure can be constructed from off the shelf components. A wide and/or arbitrarily designed field of view may be provided in certain embodiments. Instantaneous measurement of depolarization may be provided in certain embodiments. A structure that is robust against intensity noise may be provided.

A possible use scenario for the herein described receivers and/or emitters is in association with securing transmissions between communicating devices and privacy of the communicating parties. Examples of applications that typically rely on secure transactions over the Internet or other data communication networks include banking, shopping and other financial transactions, email, corporate communications, cloud computing and so on. For example, communications between parties can be vulnerable to eavesdropping or other attacks by hackers. Encryption with help of quantum key distribution (QKD) is considered as one possibility for improving security. QKD is seen as a promising solution e.g. for public key distribution to exchange secret keys between authorized parties. In QKD distribution of keys is based on sending of photons between the devices over an optical link. In practice, faint pulses containing a photon number smaller than one in average are send. The QKD is based on the idea that key bits are encoded in quantum systems and exchanged between the parties. QKD enables the parties to detect the presence of a third party trying to gain knowledge of the key because an attempt of eavesdropping a quantum system in general disturbs the system. Because of this a third party trying to measure the signal introduces detectable anomalies. In QKD the trust can thus be placed on the laws of physics and nature rather than increased complexity and computing power. The parties can be provided with photon detectors of the herein described type.

Devices such as personal computers, servers and other devices associated with a communications link have traditionally been mostly fixed and connected through cables and/or fibre optics. However, the number of mobile devices that communicate over wireless interfaces is increasing. Also, the volume of sensitive information communicated between various devices is increasing, in part because of various new applications requiring safe communications. A mobile device can be provided with apparatus for communication on an optical channel. Non-limiting examples of mobile devices include a mobile station (MS) such as a mobile phone or what is known as a 'smart phone', a portable computer such as a laptop, tablet or a personal data assistant (PDA) provided with wireless communication capabilities, or any combinations of these or the like.

There are also other possible uses of the analyser. For example, the analyser can be used optical procedures such as those based on ellipsometry. Polarized light can be used to characterize optical properties of materials, either in bulk or thin film format. The different methods of generating and analysing the polarization properties of light is traditionally called ellipsometry. The particularity of spectroscopic ellipsometry is that it measures three independent values at each wavelength (intensity in both polarization plus phase relation), allowing the technique to provide more information than other available techniques, such as conventional reflectometry. Because of this spectroscopic ellipsometry is considered an accurate thin film measurement tool. Accurate measurement of polarization can also be used for non-invasive measurement such a measurement of glucose concentration.

According to an example appropriate apparatus or means are provided for dividing light into a plurality of light outputs. Such apparatus can comprise means for dividing a light input into a first part and a second part, means for dividing the first part into a first polarized part and a second polarized part to provide a first polarized output and a second polarized output, means for altering at least once polarization of light in the second part, and means for dividing the light with altered polarization into at least one third polarized part and at least one fourth polarized part to provide at least one third polarized output. Means for producing at least one fourth polarized output from at least one fourth polarized part can also be provided.

Means for dividing the second part into a third part and a fourth part and polarization beam splitting means for receiving light in the third part altered by a first polarization altering device and providing therefrom a third output and a fourth output can be also be provided. The fourth part can be led into a second polarization altering device and further polarization beam splitting means can provide a fifth output and a sixth output from the fourth part altered by the second polarization altering device.

According to an embodiment apparatus for generating light with controlled polarization comprises means for inputting at least three light inputs into polarization beam splitters operated in reverse for combining and/or directing polarized light from the light inputs into an output of the respective polarization beam splitter, means for altering the polarization of at least one of the polarized lights, and means for directing light propagated through the polarization beam splitters and the means for altering the polarization to an output.

In accordance with a possibility an apparatus is provided comprising means for receiving light from a first input and a second input to provide in a first output first and second polarized light, means for receiving light from a third input and a fourth input to provide in a second output third and a fourth polarized light for input into a first polarization altering device, means for altering the polarization of the third and fourth polarized light, means receiving light from a fifth input and a sixth input to provide in a third output fifth and sixth polarized light for input into a second polarization altering device, and means altering the polarization of the fifth and sixth polarized light.

It is noted that whilst embodiments have been described using creation use scenarios and devices, similar principles can be applied to any other context where light is received and or emitted. Therefore, although certain embodiments were described above by way of example with reference to certain exemplifying architectures for wireless networks, technologies and standards, embodiments may be applied to any other suitable forms of communication systems than those illustrated and described herein.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. An apparatus for dividing light input into a plurality of light outputs, comprising:
   a first beam splitter configured to divide the light input into a first part and a second part,
   a first polarization beam splitter configured to provide from the first part a first polarized part and a second polarized part, wherein the first polarized part is for providing a first output and the second polarized part for providing a second output,
   at least one polarization altering device configured to alter the polarization of light in the second part,
   at least one second polarization beam splitter configured to receive light altered by respective at least one polarization altering device and provide therefrom at least one third polarized part for providing at least one third output, and at least one light deflecting device configured to direct the light in the second polarized part produced by the first polarization beam splitter and at least one fourth polarized part produced by the at least one second polarization beam splitter to be parallel with the first polarized part at the respective outputs of the apparatus.

2. An apparatus according to claim 1, wherein the at least one second polarization beam splitter is configured to provide at least one fourth output.

3. An apparatus according to claim 1, wherein the at least one polarization altering device comprises a half-wave plate and/or a quarter-wave plate.

4. An apparatus according to claim 1 wherein
the at least one polarization altering device configured to provide a different alteration of polarization, and wherein the apparatus further comprises:
a second beam splitter configured divide the second part further into a third part and a fourth part and to project the third part into a second polarization beam splitter and the fourth part into the at least one polarization altering device, wherein the second polarization beam splitter is configured to provide a third output and a fourth output from light propagated through the at least one polarization altering device, and
a third polarization beam splitter configured to receive light altered by the at least one polarization altering device and provide a fifth output and a sixth output.

5. An apparatus according to claim 1 comprising at least two polarization altering devices arranged in serial configuration or in parallel configuration for altering polarization of light in the second part.

6. An apparatus according to claim 1 comprising a detector apparatus configured to detect light at the plurality of outputs, the detector apparatus comprising one of a single photon detector array and a charge coupled device, CCD, camera.

7. An apparatus according to claim 6, wherein a pinhole or a lens arrangement is provided between the plurality of outputs and the single photon detector array.

8. An apparatus according to claim 1 wherein the apparatus is configured for receiving optical signals for quantum cryptography, ellipsometry or polarization measurements.

9. An apparatus for generating light with controlled polarization, comprising:
a first polarization altering device,
a second polarization altering device configured to provide a different alteration of polarization, and
a first, a second and a third polarization beam splitter, wherein
the first polarization beam splitter is configured to receive light from a first input and a second input and to provide in a first output, first and second polarized light,
the second polarization beam splitter is configured to receive light from a third input and a fourth input and to provide in a second output, third and fourth polarized light for input into the first polarization altering device, and
the third polarization beam splitter is configured to receive light from a fifth input and a sixth input and to provide in a third output, fifth and sixth polarized light for input into the second polarization altering device, wherein the first, second, and third polarization beam splitters are operated in reverse to combine and/or direct polarized light from associated light inputs into an output thereof,
the first and second polarization altering devices are configured to alter at least one of the polarizations, and
the first, second, and third output propagated through the first, second, and third polarization beam splitters and the first and second polarization altering device.

10. A method for dividing light into a plurality of light outputs, comprising:
dividing a light input into a first part and a second part,
dividing the first part into a first polarized part and a second polarized part to provide a first output and a second output,
altering at least once polarization of light in the second part,
dividing by at least one second polarization beam splitter the light with altered polarization into at least one third polarized part to provide at least one third output, and
directing the light in the second polarized part and at least one fourth polarized part to be in parallel with the first polarized part at the respective outputs.

11. A method according to claim 10, comprising producing at least one fourth output from the at least one fourth polarized part provided by the at least one second polarization beam splitter.

12. An method according to claim 10, comprising:
dividing the second part by a second beam splitter into a third part and the at least fourth polarized part,
projecting the third part into a second polarization beam splitter, the second polarization beam splitter receiving light in the third part altered by a first polarization altering device and providing therefrom a third output and a fourth output,
projecting the at least fourth polarized part into a second polarization altering device, and
providing by a third polarization beam splitter a fifth output and a sixth output from the at least fourth polarized part altered by the second polarization altering device.

13. A method according to claim 10, comprising altering polarization of light in the second part by at least the first and second polarization altering devices arranged in serial configuration or in parallel configuration.

14. A method according to claim 10, comprising detecting light at the plurality of outputs by detector apparatus comprising one of a single photon detector array and a charge coupled device, CCD, camera.

15. A method according to claim 10, comprising receiving optical signals for quantum cryptography, ellipsometry or polarization measurements.

16. A method for generating light with controlled polarization, comprising:
receiving light from a first input and a second input to provide in a first output, first and second polarized light,
receiving light from a third input and a fourth input to provide in a second output, third and fourth polarized light for input into a first polarization altering device,
altering the third and fourth polarized light by the first polarization altering device,
receiving light from a fifth input and a sixth input to provide in a third output, fifth and sixth polarized light for input into a second polarization altering device, and
altering the fifth and sixth polarized light by the second polarization altering device, inputting the first, second, third, fourth, fifth, and sixth inputs into polarization beam splitters operated in reverse for combining and/or directing polarized light from the first, second, third, fourth, fifth, and sixth inputs into an output of a respective polarization beam splitter, altering the polarization of at least one of the first, second, third, fourth, fifth, and sixth polarized lights, and directing light propagated through the polarization beam splitters and the first and second polarization altering device to the first, second, and third outputs.

17. A method according to claim 16, comprising enhancing polarizations of the light inputs by the polarization beam splitters.

\* \* \* \* \*